United States Patent
O'Shea

[15] 3,686,313
[45] Aug. 22, 1972

[54] 1,2-BIS[3-ALKYL-4-HYDROXY-5-(DIALKYLAMINOMETHYL-PHENYLTHIS]ETHANES

[72] Inventor: Francis X. O'Shea, Naugatuck, Conn.

[73] Assignee: Uniroyal, Inc., New York, N.Y.

[22] Filed: Nov. 29, 1968

[21] Appl. No.: 780,237

[52] U.S. Cl. ............260/570.9, 252/47, 252/402, 260/45.9 R, 260/247.7 R, 260/294.7, 260/326.5 S, 260/398.5, 260/570.5 P, 260/570.5 S, 260/609 R, 260/808
[51] Int. Cl. .............................................C07c 87/28
[58] Field of Search..............260/570, 570.5, 570.9

[56] References Cited

UNITED STATES PATENTS

| | | | |
|---|---|---|---|
| 3,219,700 | 11/1965 | O'Shea et al. | 260/569 |
| 3,299,147 | 1/1967 | O'Shea | 260/570.5 X |
| 3,310,587 | 3/1967 | O'Shea | 260/570.5 X |
| 3,489,804 | 1/1970 | O'Shea | 260/570.5 X |

*Primary Examiner*—Robert V. Hines
*Attorney*—Willard R. Sprowls

[57] ABSTRACT

This invention is directed to a new series of compounds which are useful as antioxidants. These compounds are represented by the formula:

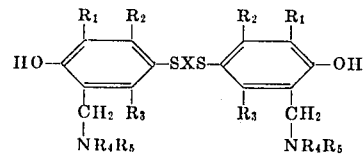

wherein $R_1$ is selected from the group consisting of alkyl groups of up to 12 carbon atoms, cycloalkyl groups of from about six to eight carbon atoms and aralkyl groups of from about seven to nine carbon atoms, $R_2$ and $R_3$ are selected from the group consisting of hydrogen and methyl, $R_4$ and $R_5$ are selected from the group consisting of alkyl groups of up to five carbon atoms and X is a diradical containing from about two to about 14 carbon atoms and is selected from the group consisting of:

a. polymethylene diradicals of the formula $-(CH_2)_n-$ wherein $n$ is a whole number from 2 to 14;

b. branched chain polyalkylene diradicals of the formula:

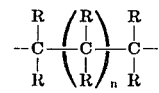

wherein $n$ is a whole number from 0 to 11 and the R groups may be hydrogen or alkyl groups and at least one of the R groups is an alkyl group.

3 Claims, No Drawings

1,2-BIS[3-ALKYL-4-HYDROXY-5-(DIALKYLAMINOMETHYL-PHENYLTHIS]ETHANES

This invention relates to a new series of compounds which are useful as antioxidants for rubber, plastics, fats, petroleum products and other organic materials normally subject to oxidative deterioration. The compounds of this invention may be represented by the formula:

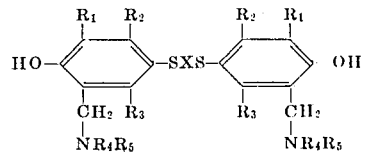

wherein $R_1$ may be an alkyl group of up to 12 carbon atoms, a cycloalkyl group of from about six to eight carbon atoms or an aralkyl group of from about seven to nine carbon atoms, $R_2$ and $R_3$ are selected from the group consisting of hydrogen and methyl, $R_4$ and $R_5$ are selected from the group consisting of alkyl groups of up to five carbon atoms or $R_4$ and $R_5$ may be joined to form with the nitrogen atom, a radical selected from the group consisting of morpholinyl, pyrrolidinyl and piperidinyl, and X is a diradical containing from about two to about 14 carbon atoms and is selected from the group consisting of:

a. polymethylene diradicals of the formula $-(CH_2)_n-$ wherein $n$ is a whole number from 2 to 14, for example:

$$-CH_2CH_2-\text{ and } -(CH_2)_{14}-$$

b. branched chain polyalkylene diradicals of the formula:

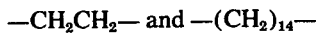

wherein $n$ is a whole number from 0 to 11 and the R groups may be hydrogen or alkyl groups and at least one of the R groups is an alkyl group, for example:

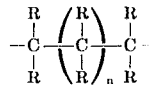

c. aralkyl diradicals of the formula:

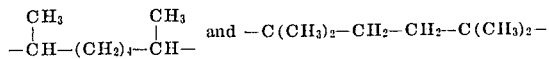

wherein R is an alkyl group of one to four carbon atoms and $n$ is a whole number from 0 to 4, for example:

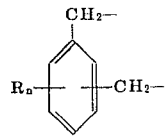

d. aralkyl diradicals of the formulas:

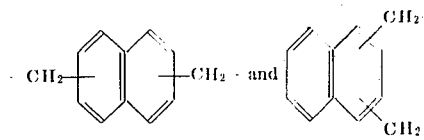

e. aralkyl diradicals of the formulas:

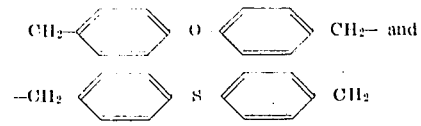

f. cyclic hydrocarbon containing diradicals of the general formula:

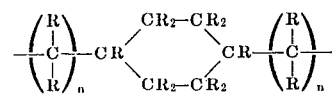

wherein R may be hydrogen or an alkyl group and $n$ is a whole number from 0 to 6, for example:

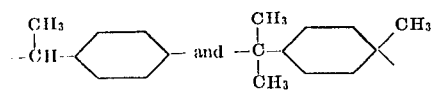

g. aliphatic diradicals containing hetero atoms of the general formula:

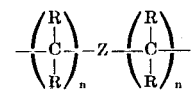

wherein R may be hydrogen or alkyl, $n$ is a whole number from 1 to 6 and Z is selected from the group consisting of $-O-$, $-S-$, $-SO_2-$ and $-NR'-$ (wherein R' is an alkyl group), for example, $-CH_2CH_2OCH_2CH_2-$ and $-CH_2CH_2SCH_2CH_2-$ h. diradicals of the formulas: $-CH_2CH_2OCH_2CH_2O CH_2CH_2-$ and $-CH_2CH_2OCH_2OCH_2CH_2-$ i. aralkyl diradicals of the general formula:

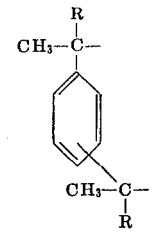

wherein R may be hydrogen or an alkyl group, for example:

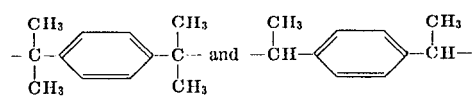

Our invention is also concerned with a novel method of preparing the aforementioned compounds. This method involves the reaction of 1 molar equivalent of the compound of the general formula:

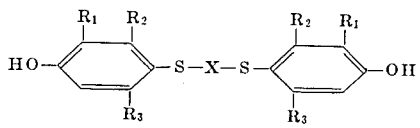

in which $R_1$, $R_2$, $R_3$ and X are as previously described with two molar equivalents of formaldehyde and two molar equivalents of a dialkylamine of the formula:

$$R_4R_5NH$$

wherein $R_4$, and $R_5$ are as previously described. This Mannich type reaction is carried out under the usual conditions for this well known reaction. The amines which may be used to prepare the Mannich base (dialkylamine) include dimethylamine, methylethylamine, diethylamine, dipropylamine, dibutylamine, diamylamine, morpholine, pyrollidine and piperidine.

The intermediate bis-phenol may be prepared by one of two general methods:

Method A — This method involves the reaction of two molar equivalents of a mercaptophenol of the general formula:

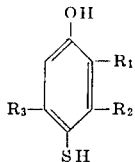

in which $R_1$, $R_2$ and $R_3$ are as previously described with two molar equivalents of an alkali metal hydroxide and one molar equivalent of an organic dihalide of the formula:

$$Hal - X - Hal$$

in which Hal represents a halogen atom and X is as previously described.

The reaction used to prepare intermediate "A" may be carried out in a suitable water miscible solvent such as methanol, ethanol, isopropanol, dioxane, ethylene glycol dimethyl ether, etc. at a temperature from about room temperature to about 100° C.

Preferred solvents for the reaction are methanol, ethanol and isopropanol, while the preferred temperature is in the range of 50° C. to 100° C. The reaction is ordinarily carried out at or near the reflux temperature of the solution, a preferred reaction time of up to 4 hours is advisable. Longer times may be used, however they are not necessary, as the reaction is generally completed within 30 minutes.

The reaction may also be carried out in a two-phase system such as benzene-water, xylene-water, etc. using vigorous agitation. Although longer reaction times are generally employed than in homogenous solution, this heterogeneous system has the advantage of providing a simplified recovery procedure. In such a two-phase system, the product is soluble in the organic phase which can be readily separated from the aqueous phase containing the alkali metal halide. The product is then obtained by removing the solvent from the organic phase.

Method B – This method involves the reaction of two molar equivalents of a mercaptophenol of the formula described in Method A, with one molar equivalent of a non-conjugated diolefin of from five to 30 carbon atoms, under acid catalysis.

This reaction may be carried out without a solvent or in a non-polar organic solvent such as hexane, benzene, xylene, etc. at a temperature up to about 150° C. The acid catalyst which may be employed includes mineral acids such as sulfuric acid, Lewis acids such as $AlCl_3$ and $BF_3$, and heterogenous catalysts such as acid clays and acidic ion exchange resins.

The mercaptophenols which may be used to prepare these intermediates by either Method "A" or Method "B" include:
2-methyl-4-mercaptophenol,
2-isopropyl-4-mercaptophenol,
2-t-butyl-4-mercaptophenol,
2-octyl-4-mercaptophenol,
2-(α-methylundecyl)-4-mercaptophenol,
2-cyclohexyl-4-mercaptophenol,
2-cyclooctyl-4-mercaptophenol,
2-(α-methylbenzyl)-4-mercaptophenol,
2,5-dimethyl-4-mercaptophenol,
2-t-butyl-4-mercapto-5-methylphenol,
2-t-octyl-4-mercapto-5-methylphenol,
2-dodecyl-4-mercapto-5-methylphenol,
2-cyclooctyl-4-mercapto-5-methylphenol,
2,3,5-trimethyl-4-mercaptophenol,
2-t-butyl-3,5-dimethyl-4-mercaptophenol,
2-dodecyl-3,5-dimethyl-4-mercaptophenol,
2-cyclohexyl-3,5-dimethyl-4-mercaptophenol and
2-benzyl-3,5-dimethyl-4-mercaptophenol.

Some of the diolefins which may be used include:
Para-diisopropenyl benzene,
Meta-diisopropenyl benzene,
Divinyl benzene,
Vinyl isopropenyl benzene,
1,7-Octadiene,
Vinyl cyclohexene,
1-Methyl-4-isopropenyl cyclohexene-1,
1-4-hexadiene,
1,13-Tetradecadiene
2,7-dimethyl-1,7-octadiene,
Ethylidene norbornene and
Isopropylidene norbornene.

The novel compounds disclosed herein have previously been unreported, and such compounds are set forth for the first time. In U.S. Pat. No. 2,472,318, issued June 7, 1949 to Philip Subkow, compounds of the following formula were disclosed:

$$RSR'SR$$

wherein R is selected from the group consisting of an aryl, alkylaryl, substituted aryl, alkylaryl groups, S is sulfur and R' is a low molecular weight alkyl group. These compounds are disclosed as possessing activity as oxidation inhibitors for lubricating oils. Among the possible structures set forth by Subkow was included the following compound, which is considered the closest prior art uncovered:

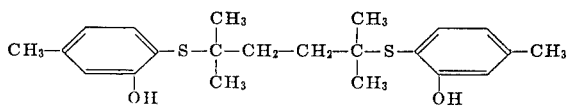

My contribution differs from the prior art in that the hydroxyl group in my compounds is para to the sulfur atom rather than ortho and my compounds contain a dialkylaminomethyl group ortho to the phenolic hydroxyl. The presence of this group provides these compounds with unexpected properties as a non-discoloring antioxidant. Chief among these properties is a striking advantage in color over compounds related to the prior art compound which do not contain such a dialkylaminomethyl group. This color advantage is of considerable commercial importance.

To illustrate the novel bis-phenolic compounds and their methods of preparation, the following examples are given. It should be understood, however, that these examples are merely illustrative and are not to be regarded as limitations to the appended claims since the basic teachings thereof may be varied at will, as will be understood by one skilled in the art. In the examples, the proportions are expressed in parts by weight unless otherwise noted.

EXAMPLE 1

The preparation of 1,2-bis[3-methyl-4-hydroxy-5-(dimethylaminomethyl)-phenylthio]ethane.

To a solution of 28 g. (0.2 mole) of 2-methyl-4-mercaptophenol and 16 g. (0.2 mole) of 50 percent aqueous sodium hydroxide in 150 ml. of ethanol was added 10 g. (0.1 mole) of ethylene dichloride. The solution was heated gently for 10 minutes near reflux. The solution was then cooled and poured into water. The oil which separated was extracted with ether and the ether extract was dried with anhydrous sodium sulfate and evaporated down to an oil which crystallized. The product was triturated with a benzene-hexane mixture and filtered yielding 24.5 g. (80 percent) of 1,2-bis(3-methyl-4-hydroxyphenylthio)ethane, m.p. 93°–96°. The melting point was raised to 96°–98° by recrystallization from benzene.

To a solution of 30.6 g. (0.1 mole) of 1,2-bis(3-methyl-4-hydroxyphenylthio)ethane and 50 g. (0.22 mole) of 45 percent aqueous dimethylamine in ethanol was added 18 g. (0.22 mole) of 37 percent aqueous formaldehyde. The solution was then heated slowly to reflux and refluxed for 3 hours. The solution was then cooled and a crystalline precipitate formed. It was filtered off, washed with aqueous ethanol and dried to give 37 g. (88 percent yield) of 1,2-bis[3-methyl-4-hydroxy-5-(dimethylaminomethyl)phenylthio]-ethane, m.p. 93°–95° C after recrystallization from hexane.

Analysis: Calc'd. for $C_{22}H_{32}N_2O_2S_2$: % C, 62.85; % H, 7.62; % N, 6.67; % S, 15.23.

Found: % C, 63.02; % H, 7.81; % N, 6.35; % S, 15.51.

EXAMPLE 2

The preparation of 1,2-bis[3-t-butyl-4-hydroxy-5-(dimethylaminomethyl)phenylthio ethane.

1,2-Bis(3-t-butyl-4-hydroxyphenylthio)ethane, m.p. 121°–123° C, was prepared by reacting 2-t-butyl-4-mercaptophenol with ethylene dichloride in the same manner as described in Example 1.

This intermediate was then reacted with formaldehyde and dimethylamine in the same manner as described in Example 1 to yield 1,2-bis[3-t-butyl-4-hydroxy-5-(dimethylaminomethyl)phenylthio] ethane, m.p. 133°–135° C is crystallization from ethanol.

Analysis: Calc'd. for $C_{28}H_{44}N_2O_2S_2$: % N, 5.56; % S, 12.70.

Found: % N, 5.79; % S, 13.0.

EXAMPLE 3

The preparation of 1,4-bis[3-t-butyl-4-hydroxy-5-(dimethylaminomethyl)phenylthio butane.

1,4-Bis(3-t-butyl-4-hydroxyphenylthio)butane was prepared by reacting 2-t-butyl-4-mercaptophenol with 1,4-dichlorobutane in the same manner as described in Example 1.

This intermediate was then reacted with formaldehyde and dimethylamine in the same manner as described in Example 1 to yield 1,4-bis[3-t-butyl-4-hydroxy-5-(dimethyl-aminomethyl)phenylthio] butane in 70 percent yield, m.p. 129°–130° C.

Analysis: Calc'd. for $C_{30}H_{48}N_2O_2S_2$: % C, 67.6; % H, 9.02; % N, 5.26; % S, 12.03.

Found: % C, 67.92; % H, 9.49; % N, 5.12; % S, 11.74.

EXAMPLE 4

The preparation of β, β'-bis[3-methyl-4-hydroxy-5-(dimethylaminomethyl)phenylthio diethyl ether.

β, β'-bis(3-methyl-4-hydroxyphenylthio)diethyl ether was prepared by reacting 2-methyl-4-mercaptophenol with β, β'-dichlorodiethyl ether in the same manner as described in Example 1.

This intermediate was then reacted with formaldehyde and dimethylamine in the same manner as described in Example 1 to yield β, β'-bis[3-methyl-4-hydroxy-5-(di-methylaminomethyl)phenylthio] diethyl ether as a viscous oil in 90 percent yield.

EXAMPLE 5

The preparation of 1,2-bis[2-methyl-3-(dimethyl-aminomethyl)-4-hydroxy-5-t-butylphenylthio] ethane.

1,2-bis(2-methyl-4-hydroxy-5-t-butylphenylthio) ethane, m.p. 142°–144° C, was prepared by reacting 2-t-butyl-4-mercapto-5-methylphenol with ethylene dichloride in the same manner as described in Example 1.

This intermediate was then reacted with formaldehyde and dimethylamine in the same manner as described in Example 1 to yield 1,2-bis[2-methyl-3-(dimethylaminomethyl)-4-hydroxy-5-t-butylphenylthio] ethane, m.p. 148°–150° C.

EXAMPLE 6

The preparation of α, α'-bis[3-methyl-4-hydroxy-5-(pyrrolidylmethyl)-phenylthio]-p-diisopropylbenzene.

To a solution of 21 g. (0.15 mole) 2-methyl-4-mercaptophenol and 12 g. (0.075 mole) of p-diisopropenyl benzene in 30 ml. of benzene was added 3 g. of KSFO Activated Montmorillonite Catalyst (Girdler Catalyst - Chemical Products Division of Chemetron Corporation). The mixture was heated to reflux and after a few minutes a solid product precipitated. It was filtered off and recrystallized from ethanol, the hot solution being filtered to remove the catalyst. The α, α'-bis(3-methyl-4-hydroxyphenylthio)-p-diisopropylbenzene obtained had a melting point of 184°–185° C.

To a solution of 14.5 g. (0.033 mole)α, α'-bis (3-methyl-4-hydroxyphenylthio)-p-diisopropylbenzene in 100 ml. of ethanol was added 4.7 g. (0.066 mole) pyrrolidine and 4.4 g. (0.066 mole) 37 percent aqueous formaldehyde. The solution was heated slowly to reflux, then refluxed for two hours. The solution was then cooled and the precipitate which formed was filtered off, washed with aqueous ethanol and dried yielding α, α'-bis[3-methyl-4-hydroxy-5-(pyrrolidylmethyl)phenylthio]-p-diisopropylbenzene, m.p. 120°–122° C.

EXAMPLE 7

This example demonstrates the usefulness of the compounds of this invention as stabilizers for an ethylene propylene terpolymer.

A hexane solution of a commercial ethylene-propylene-dicyclopentadiene terpolymer containing no stabilizer was used as the base polymer. The solution was diluted with hexane so as to provide a 4 percent polymer solution. An aliquot portion of a benzene solution of the compound to be evaluated was added so as to provide 1 percent by weight of the additive based upon the weight of the polymer in the solution. A thin film of rubber was then deposited on a sodium chloride disk by evaporating five drops of the solution on the 1-inch diameter disk.

The disks were then placed in a 150° C. oven and removed after 1 hour and every hour thereafter. At each interval, the infrared spectrum of the polymer film was obtained. Oxidation of the polymer film is evidenced by the appearance of a band at 5.85 μ in the spectrum caused by the development of carbonyl groups in the polymer. The time of aging required by the appearance of this band in the spectrum is taken as the break time. The effectiveness of compounds as stabilizers can be evaluated by the length of time they protect the rubber against oxidation as determined by this carbonyl development test.

The use of infrared spectrophotometry in following the oxidation of polymer films has been described by Bishop [Anal. Chem., 33, 456 (1961)].

| Added Stabilizer | Hours to break |
|---|---|
| (1) None | 2 |
| (2) bis(3-methyl-4-hydroxyphenylthio)ethane | 6 |
| (3) bis(3-t-butyl-4-hydroxyphenylthio)ethane | 8 |
| (4) bis[3-methyl-4-hydroxy-5-(dimethylaminomethyl)phenylthio]ethane | 12 |
| (5) bis[3-t-butyl-4-hydroxy-5-(dimethylaminomethyl)phenylthio]ethane | 12 |

The results demonstrate the value of the compounds of this invention (4 and 5) as stabilizers compared to compounds representative of the prior art (2 and 3).

Non-discoloring characteristics were determined in this polymer by aging one gram of rubber obtained from the above described polymer solutions at 150° C. for 1 hour and observing for color formation.

| Added Stabilizer | Color |
|---|---|
| (1) bis(3-methyl-4-hydroxyphenylthio)ethane | black |
| (2) bis(3-t-butyl-4-hydroxyphenylthio)ethane | black |
| (3) bis[3-methyl-4-hydroxy-5-(dimethylaminomethyl)phenylthio]ethane | amber |
| (4) bis[3-t-butyl-4-hydroxy-5-(dimethylaminomethyl)phenylthio]ethane | light amber |

The results demonstrate the superiority of the compounds of this invention (3 and 4) over compounds representative of prior art (1 and 2) in commercially important non-discoloring characteristics.

Having thus described my invention, what I claim and desire to protect by Letters Patent is:

1. A chemical of the formula:

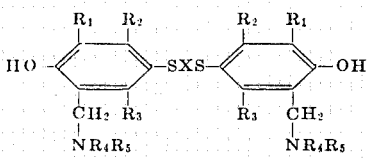

wherein $R_1$ is selected from the group consisting of alkyl groups of up to 12 carbon atoms, cycloalkyl groups of from about six to eight carbon atoms and aralkyl groups of from about seven to nine carbon atoms, $R_2$ and $R_3$ are selected from the group consisting of hydrogen and methyl, $R_4$ and $R_5$ are selected from the group consisting of alkyl groups of up to five carbon atoms, and X is a diradical containing from about two to about 14 carbon atoms and is selected from the group consisting of:

a. polymethylene diradicals of the formula $-(CH_2)_n-$ wherein $n$ is a whole number from 2 to 14;

b. branched chain polyalkylene diradicals of the formula:

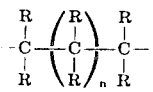

wherein $n$ is a whole number from 0 to 11 and the R groups may be hydrogen or alkyl groups and at least one of the R groups is an alkyl group;

wherein R may be hydrogen or an alkyl group.

2. The compound of claim 1 wherein $R_1$ is methyl, $R_2$ and $R_3$ are hydrogen, $R_4$ and $R_5$ are methyl, and X is $-CH_2CH_2-$.

3. The compound of claim 1 wherein $R_1$ is t-butyl, $R_2$ and $R_3$ are hydrogen, $R_4$ and $R_5$ are methyl, and X is $-CH_2CH_2-$.

* * * * *

PO-1050
(5/69)

UNITED STATES PATENT OFFICE
CERTIFICATE OF CORRECTION

Patent No. 3,686,313      Dated August 22, 1972

Inventor(s) Francis X. O'Shea

It is certified that error appears in the above-identified patent and that said Letters Patent are hereby corrected as shown below:

Cover sheet, item [54], second and third lines, and column 1, lines 2 and 3, should read: --(DIALKYLAMINOMETHYL)-PHENYLTHIO]ETHANES.

Column 8, lines 48-49: delete "; wherein R may be hydrogen or an alkyl group".

Signed and sealed this 29th day of May 1973.

(SEAL)
Attest:

EDWARD M. FLETCHER, JR.      ROBERT GOTTSCHALK
Attesting Officer      Commissioner of Patents